United States Patent
Licitis

[15] 3,697,086
[45] Oct. 10, 1972

[54] PHONOGRAPH INDEX MEANS

[72] Inventor: Gunars Licitis, Lombard, Ill.

[73] Assignee: Marvin Glass & Associates, a partnership

[22] Filed: Feb. 8, 1971

[21] Appl. No.: 113,299

[52] U.S. Cl. ....................274/17
[51] Int. Cl. ....................G11b 17/06
[58] Field of Search ....................274/14, 17, 20, 21, 1 A

[56] References Cited

UNITED STATES PATENTS

| | | | |
|---|---|---|---|
| 2,459,038 | 1/1949 | McKnight | 274/17 |
| 3,086,297 | 4/1963 | Kay | 274/14 X |
| 3,610,638 | 10/1971 | Castagna | 274/14 |

*Primary Examiner*—Harry N. Haroian
*Attorney*—Hofgren, Wegner, Allen, Stellman & McCord

[57] ABSTRACT

Apparatus for indexing a stylus relative to any of a plurality of recording bands on a record. The apparatus includes an elongated tone arm mounting a stylus and which is received in a bridge on an indexing arm movably mounted for indexing relative to a record. The tone arm is connected to the indexing arm by means of a connection which permits pivotal movement of the tone arm relative to the indexing arm and cocking of the tone arm relative to the indexing arm. A spring is provided to bias the tone arm about the connection in such a way that the stylus of the same will be in contact with the record and a manual operator is provided and connected to the indexing arm such that upon movement of the same, the tone arm will be cocked about the connection and pivoted about the same to a predetermined position on the indexing arm which then may be moved to a desired band on the record.

6 Claims, 6 Drawing Figures

INVENTOR
GUNARS LICITIS
BY Hofgren, Wegner, Allen, Stellman & McCord
ATTORNEYS

INVENTOR
GUNARS LICITIS
BY Hofgren, Wegner, Allen, Stellman & McCord
ATTORNEYS

INVENTOR
GUNARS LICITIS
BY Hofgren, Wegner, Allen, Stellman & McCord
ATTORNEYS

PHONOGRAPH INDEX MEANS

BACKGROUND OF THE INVENTION

This invention relates to sound reproduction apparatus and more particularly, to means for indexing a stylus relative to a record.

Over the years, there have been a number of proposals for sound reproduction systems employing records. However, notwithstanding the large number of such proposals, there is currently unavailable a sound reproducing apparatus that can be economically manufactured for use in, for example, toys, and which has good sound reproduction characteristics.

SUMMARY OF THE INVENTION

The principal object of the invention is to provide a new and improved sound reproducing device, and more particularly, means for indexing a stylus relative to a record having a plurality of recording bands.

The foregoing object is realized through a construction including a tone arm mounting a stylus, which tone arm is received on a bridge mounted on an indexing arm movably mounted at one end. The tone arm is further connected to the indexing arm by means of a pivotal construction which permits the tone arm to cock relative to the indexing arm, pivot relative to the same and move longitudinally of the axis of the pivot. The tone arm is biased to a predetermined position longitudinally on the pivot in such a way that the stylus will normally be in engagement with a record and a manual operator is connected to the indexing arm at an end thereof. The manual operator includes a detent portion for holding the indexing arm at a desired position of movement relative to a record corresponding to the approximate start of a particular band thereon. The manual operator also includes a tone arm engaging element which engages the tone arm intermediate the pivot and the point whereat the same passes through the bridge when indexing is desired to move the tone arm longitudinally along the pivot to move the stylus out of contact with the record and pivot the tone arm about the pivot to a position whereby the stylus will enter the exact beginning of a recording band on the record when the handle is released.

Other objects and advantages of the invention will become apparent from the following specification taken in conjunction with the accompanying drawings.

DESCRIPTION OF THE PREFERRED EMBODIMENT

Figures 1, 2, 3:
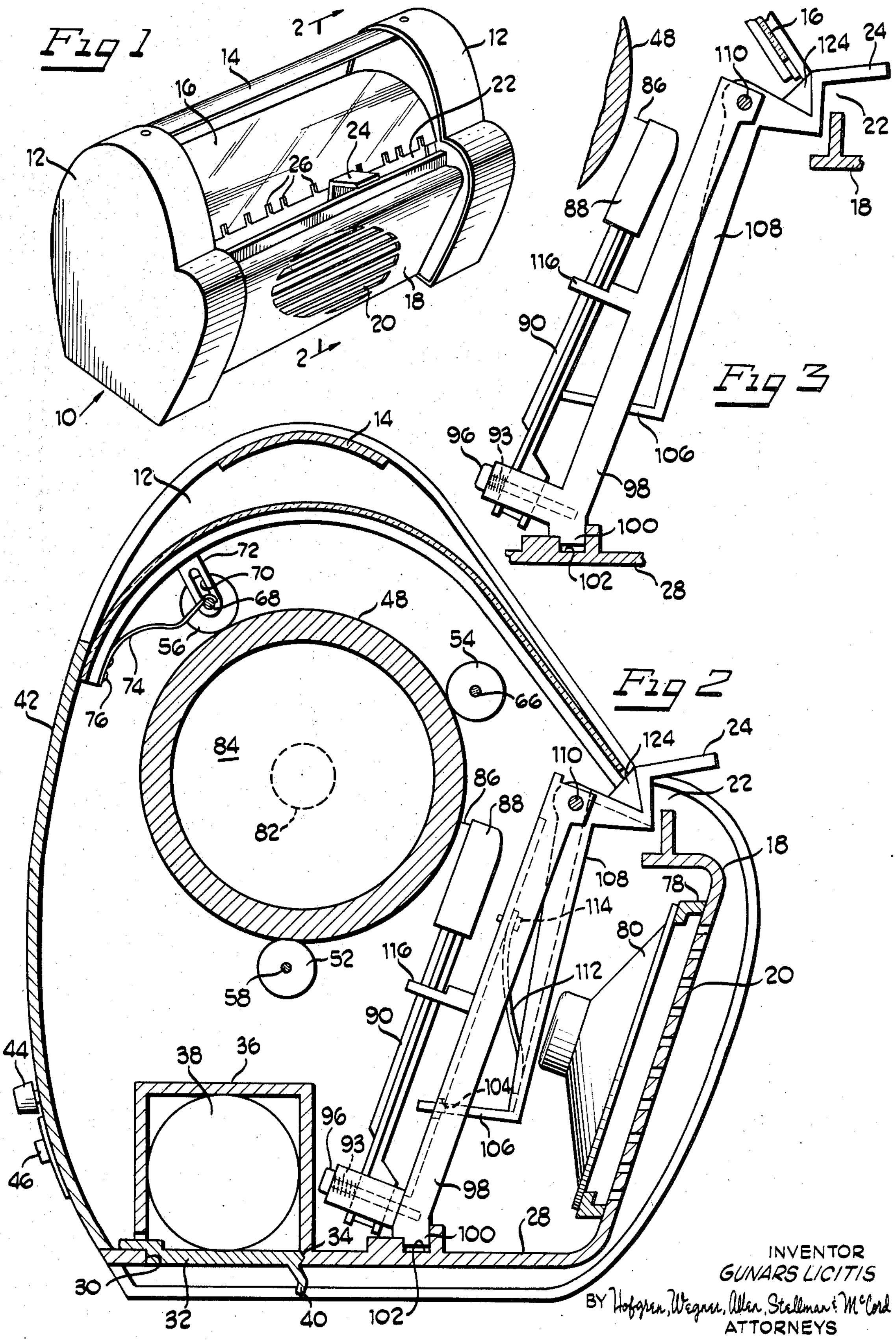
FIG. 1 is a perspective view of a preferred embodiment of the invention.
FIG. 2 is a vertical section taken approximately along the line 2—2 of FIG. 1.
FIG. 3 is a fragmentary vertical section illustrating the position of various elements of the indexing mechanism during an indexing operation.

An exemplary embodiment of the invention is illustrated in FIG. 1 and is seen to comprise a housing, generally designated 10, configured in the form of a juke box. The housing 10 is formed by a pair of end panels 12 which are interconnected at their tops by a handle 14 which is spaced above a transparent cover 16. The housing 10 further includes a front panel 18 having a grate 20 behind which a sound reproduction device may be located.

The cover 16 and the front panel 18 terminate short of each other to define a slot 22 in which a handle 24 on a manual operator for indexing an audio pickup may be moved. Various slots 26 are provided in the lower edge of the cover 16 to serve as portions of detents for the manual operation when a particular band has been selected for playback.

Turning now to FIG. 2, the housing 10 further includes a bottom wall 28 having an opening 30 therein. The opening 30 is normally closed by a pivoted door member 32 and held in such a position by a detent 34. Immediately above the opening 30 is a battery housing 36 for receiving batteries 38 which may be placed in or removed from the battery housing 36 by suitable manipulation of the door 32 by means of a handle 40 thereon.

The housing 10 also includes a back panel 42 mounting a volume control 44 and an off-on switch 46. Either the back panel 42 or one of the side panels 12 may also be provided with a door (not shown) through which a record 48 may be placed into the housing 10 or removed therefrom.

Figure 4:
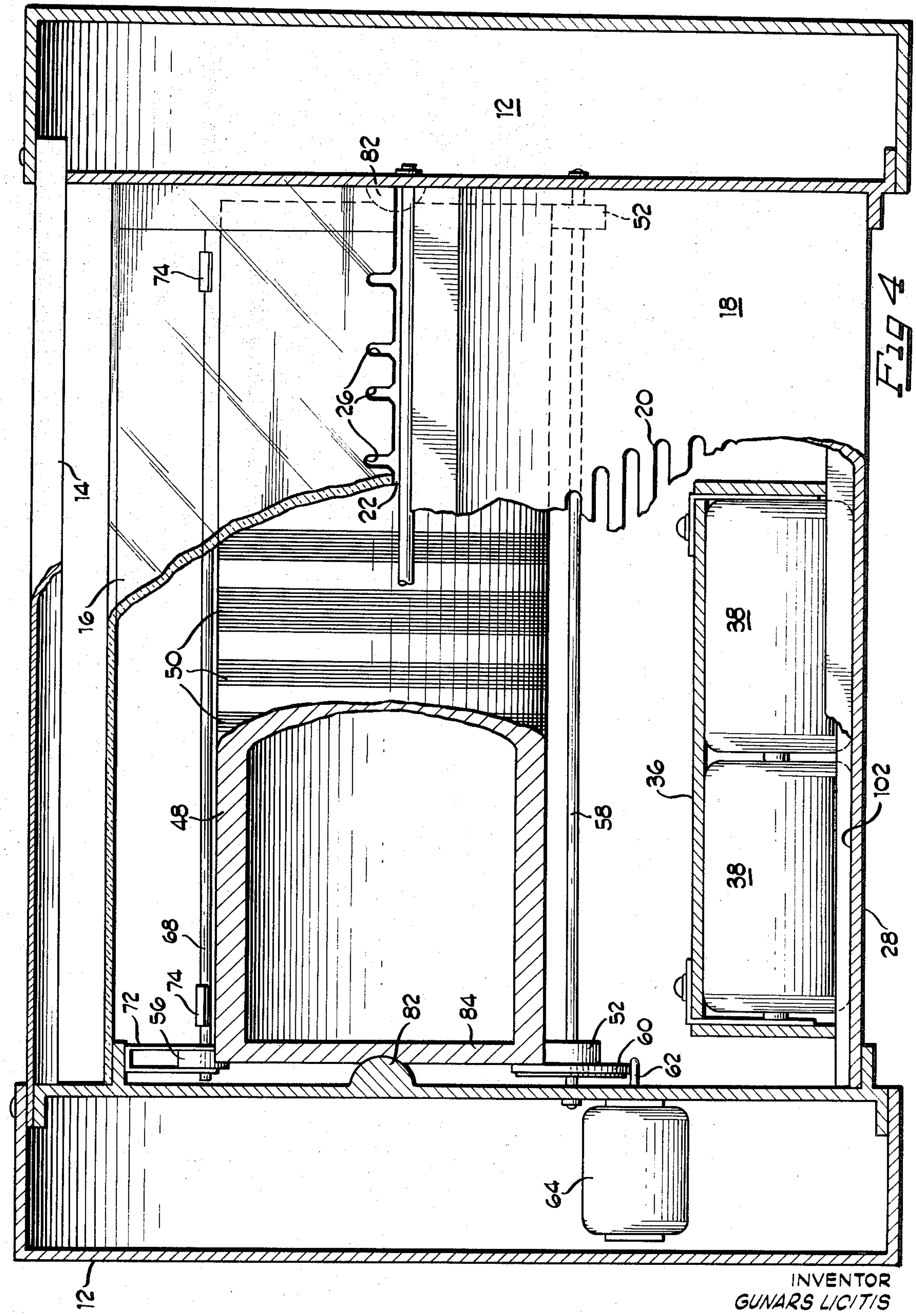
FIG. 4 is a front elevation of the invention with parts broken away for clarity.

As best seen in FIGS. 2 and 4, the record 48 is in the form of a hollow cylinder and has a plurality of separate recording bands 50 extending about its cylindrical surface. While the record 48 is illustrated as a cylindrical drum, it need not be cylindrical in shape but could be in the form of any number of surfaces of revolution.

The record 48 is rotatably received within the housing 10 in a cradle defined by two pairs of three rollers 52, 54 and 46 with each pair being disposed adjacent a respective end of the housing 10. The rollers 52 in each pair are mounted for rotation with the shaft 58 which in turn mounts a friction disc 60 in engagement with the output shaft 62 of an electrical motor 64. The arrangement is such that when the motor 64 is energized, the friction disc 60 will be driven to impart rotation to the shaft 58 and thus to the rollers 52 and due to the engagement of the latter with the ends of the record 48, the same will rotate.

The rollers 54 are mounted on a shaft 66 journaled within the housing and are merely idler rollers.

The rollers 56 in each pair are mounted on a shaft 68 which, unlike the shafts 58 and 66, is not fixably journaled to the end walls of the housing 10. Rather, the same is journaled in elongated slots 70 formed in respective lugs 72 depending from the cover 16. As best seen in FIG. 4, each of the lugs 72 is formed as a U-shaped member and the corresponding roller 56 is located in between the legs thereof. A pair of leaf springs 74 are secured to the cover as by rivets 76 and are in engagement with the shaft 68 near respective ends of the same to normally bias the same downwardly within the slot 70. As a result, the record 48 may be removed from the cradle simply by pulling rearwardly on the same whereupon the rollers 56 will move upwardly against the bias of the spring 74 to permit removal of the record. By the same token, to insert the record into the cradle it need only be moved forwardly in the housing whereupon the rollers 56 will be moved upwardly and thereafter returned by the springs 74 to tightly engage the periphery of the record 48 below the same in the cradle.

The housing structure also includes an inwardly extending circular flange element 78 approximately coaxial with the grate 20 to which a speaker 80 is secured in any suitable manner.

Finally, the innermost walls of the end members 12 may be provided with semispherical projections 82 which may snap-fit in complementary recesses in end walls 84 of the record 48. The projections 82 serve to insure that the record 48 will not drift longitudinally along its axis of rotation while being rotated to insure accurate alignment of a stylus during indexing as will be seen.

Figure 5:
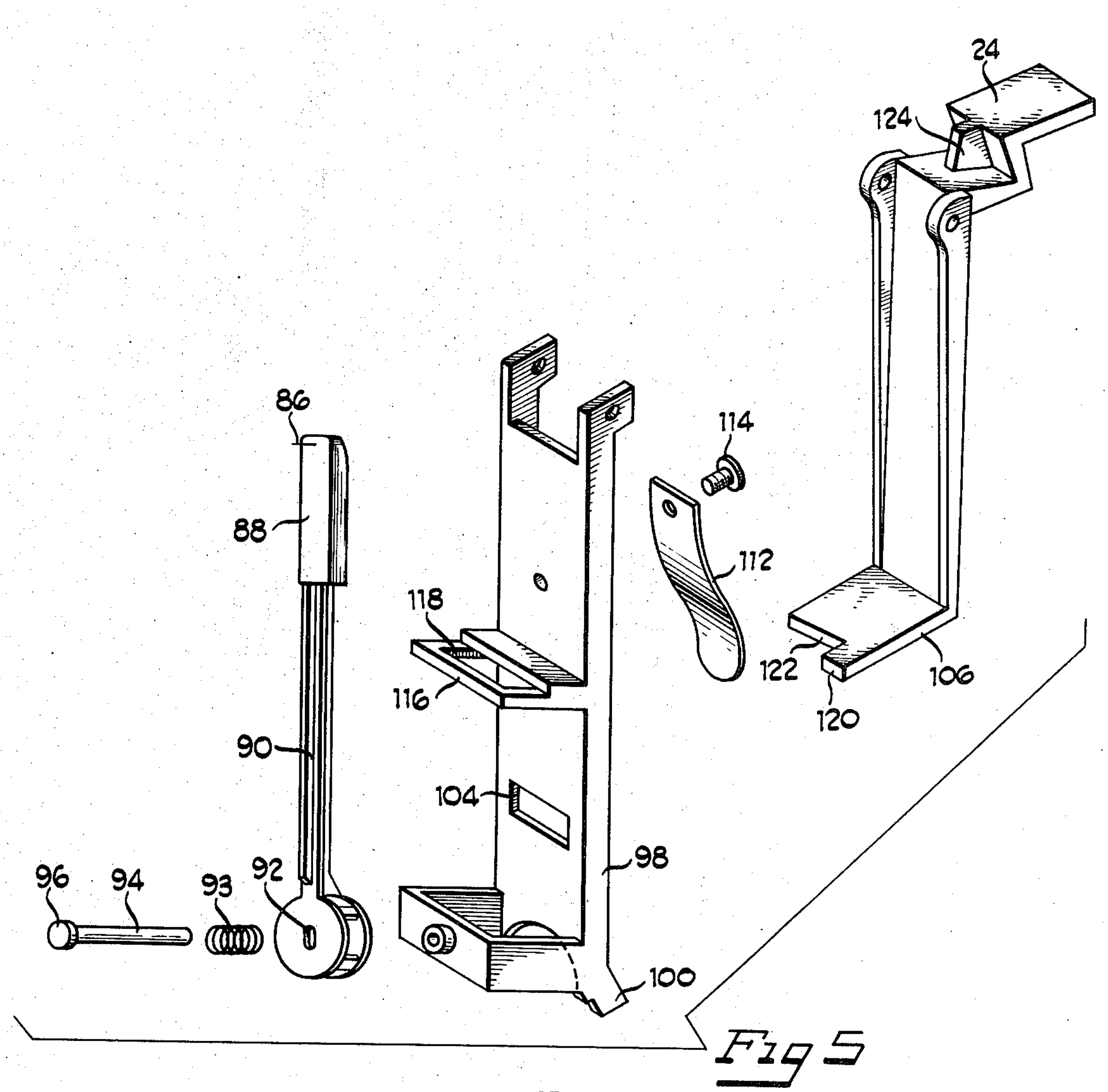
FIG. 5 is an exploded view of the indexing mechanism.

With reference to FIGS. 2 and 5, the stylus and indexing means therefor will now be described. In particular, there is provided a stylus 86 which may form part of a phonographic cartridge 88 which is mounted on one end of an elongated tone arm 90. At the end of the tone arm 90 opposite the stylus 86 there is provided a pivot including a slot 92 which is slightly elongated in the direction of the length of the tone arm 90.

The pivot is completed by a spring 93 surrounding a pin 94 which has a retaining head 96 and is received in the lower end of an elongated indexing arm 98. As a result of the foregoing connection, the tone arm 90 may pivot on the indexing arm 98, may move toward or away from the same and may be cocked with respect thereto, with the spring 93 biasing the stylus 86 toward the record 48.

The indexing arm 98 terminates at its lower end in a pair of feet 100 which are slidably received in an elongated groove 102 in the lower surface of the housing 10. As a result, the indexing arm 98 can move in a direction parallel to the axis of rotation of the record 48. With reference particularly to FIGS. 2 and 5, the indexing arm 98 is formed as a U-shaped channel and intermediate its ends, in the web portion, there is provided an elongated opening 104 through which a tone arm engaging element 106 may extend. The tone arm engaging element 106 is integrally formed at the lower end of a bell crank 108 pivotally secured at 110 to the upper end of the indexing arm 98 and ultimately connected to the handle 24.

Interposed between the web of the indexing arm 98 and the bell crank 108 is a leaf spring 112 secured to the web of the indexing arm 98 by means of a screw 114. The leaf spring 112 is configured to normally urge the bell crank 108 in a counterclockwise direction about the pivot 110 as viewed in any one of the Figures.

The indexing arm 98 is completed by a bridge 116 extending leftwardly from the web as viewed in FIG. 2. As best seen in FIG. 5, the bridge 116 includes an elongated opening 118 which receives the tone arm 90.

With reference now to FIG. 5, the tone arm engaging element 106 on the bell crank 108 terminates in a projection 120 flanked on one side by a diagonally shaped notch 122. The uppermost arm of the bell crank 108 further includes an upwardly projecting lug 124 which cooperates with the notches 26 in the cover 16 to provide a detent for the manual operator.

Figure 6:
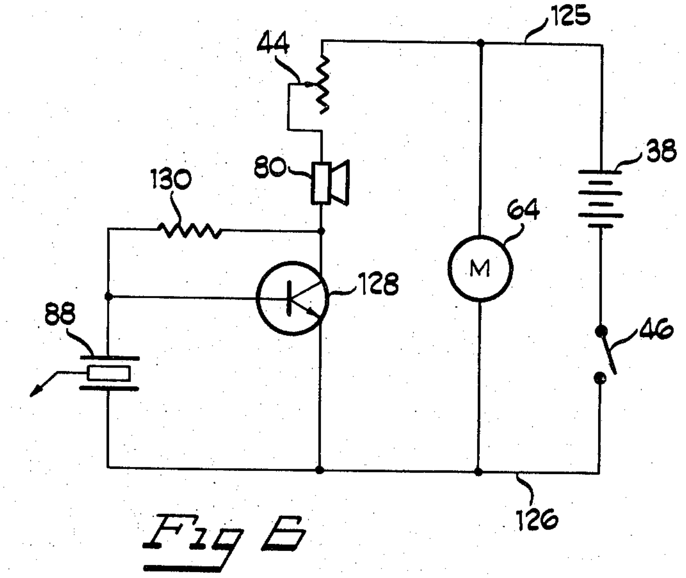
FIG. 6 is a schematic illustrating a sound reproduction system.

Turning now to FIG. 6, the electronics of the sound reproduction system will be described. In particular, the batteries 38 are connected in series with the off-on switch to lines 125 and 126 which distribute power to the remainder of the circuitry. The motor 64 for driving the record is connected between the lines 125 and 126 and will be energized whenever the switch 46 is closed. The cartridge 88 is connected between the line 126 and the base of a so-called "Darlington transistor" 128 which in essence is a conventional two transistor Darlington connected emitter follower amplifier housed in a single can. The emitter of the transistor 128 is also connected to the line 126 while the collector of the same is connected in series through the speaker 80 and the volume control 44 to the line 125. The circuit is completed by a resistor 130 connected between the common junction of collector of the transistor 128 and the speaker 80 and the common junction of base of transistor 128 and the cartridge 88.

The operation of the circuit is as follows. When the switch 46 is closed, the motor 64 will be energized to rotate the record. Assuming that the stylus is in contact with a recording band on the same, the cartridge 88 will sense the mechanical vibrations, and in a conventional manner, convert the same to electrical signals to control the conductivity of the transistor 128 which in turn drives the speaker 80. Volume control is achieved simply by adjusting the volume control potentiometer 44 to control the maximum current flow in the circuit including the transistor amplifier 128 and the speaker 80.

The operation of the indexing system is as follows. Normally, the indexing mechanism will be in the configuration illustrated in FIG. 2. When it is desired to change to a different band, the handle 24 is depressed resulting in the bell crank 108 pivoting in a clockwise direction whereupon the tone arm engaging element 106 will engage the tone arm 90 intermediate the pivot defined by pin 94 and the bridge 116. As a result, the tone arm 90 will pivot in a clockwise direction about a point defined by its point of engagement with the bridge 116 to move the stylus 86 out of contact with the record 48. At this point, the configuration is substantially that shown in FIG. 3. The handle 24 may then be moved longitudinally within the slot 22 until a desired new band is selected at which time it may be released to permit the lug 124 to move upwardly into a detent notch 26. Simultaneously with the release of the handle 24, the biasing of the spring 93 against the lower end of the tone arm 90 will cause the same to pivot in a counterclockwise direction about its point of engagement with the bridge 116 whereupon the stylus 86 will be moved into contact with the record 48.

It should be observed that during movement of the handle 24 from one position to another, the indexing arm 98 will slide within the groove 102 in the manner mentioned previously. In addition, the engagement of the tone arm engaging element 106 with the tone arm 90 and the configuration of the projection 120 and the diagonal notch 122 will cause pivoting of the tone arm 90 about the axis of the pin 94 such that the tone arm 90 will be firmly against the side of the projection 120 adjacent the notch 122 during such indexing. As a result, when the handle 24 is released, the tone arm 90 will be in a predetermined position within the slot 118 in the bridge 116, which position will correspond to the start of a given band on the record to insure that the replay of the band selected will be initiated at the beginning of the band.

I claim:

1. Apparatus for indexing a stylus relative to any of a plurality of recording bands on a record comprising:
   a. a stylus;
   b. an elongated tone arm mounting said stylus;
   c. an indexing arm movably mounted at one end and including a bridge receiving said elongated arm for limited movement therein, said bridge being constructed and arranged to permit sufficient movement of said elongated arm so that said stylus can traverse the width of the widest band on the record;
   d. a pivot connecting the end of said tone arm opposite said stylus to one end of said indexing arm, said pivot being constructed to permit movement of said elongated arm longitudinal to the axis of the pivot;
   e. means longitudinally biasing said end of said tone arm of said pivot;
   f. a manual actuator connected to said indexing arm at the end thereof opposite said pivot, said manual actuator including a handle adapted to be gripped by an operator, a detent portion for holding said indexing arm in a desired position of movement, and a tone arm engaging element adapted to engage said tone arm at a point intermediate said pivot and the point whereat the same passes through said bridge to
      i. move said tone arm longitudinally along said pivot to move the stylus out of contact with the record and
      ii. pivot said tone arm about said pivot to a position whereby the stylus will enter the beginning of a recording band on a record when said handle is released.

2. The apparatus for indexing a stylus relative to any of a plurality of recording bands on a record of claim 1 wherein said manual operator is pivotally connected to said indexing arm, and further including spring biasing means interposed between said indexing arm and said manual operator to urge the same in a direction about the pivotal connection whereby the detent means are operative.

3. Apparatus according to claim 1 particularly suited for use with a cylindrical record adapted to be rotated about its cylindrical axis and wherein said indexing arm is movably mounted for movement longitudinally of the cylindrical axis of the record.

4. Apparatus according to claim 1 wherein said tone arm engaging element includes a projection flanked by a diagonal notch.

5. Apparatus for indexing a stylus relative to any of a plurality of recording bands on a record comprising:
   a. an elongated tone arm mounting a stylus at one end thereof;
   b. an indexing arm movably mounted at one end and including means for receiving the tone arm for limited movement relative thereto;
   c. means defining a connection between said tone arm and said indexing arm whereby said tone arm may
      i. pivot relative to said indexing arm, and
      ii. cock relative to said indexing arm,
   d. means biasing said tone arm towards a first position whereat said stylus is adapted to engage a record;
   e. a manual operator connected to said indexing arm including a handle adapted to be gripped by an operator to move said indexing arm to a desired position relative to a record; and
   f. means defining a tone arm engaging element operative when said handle is moved by an operator to
      i. cock said tone arm relative to said indexing arm to move the stylus out of contact with a record and
      ii. pivot said tone arm about said connection to a position whereby the stylus will enter the beginning of a recording band on a record when said handle is released by an operator.

6. Apparatus according to claim 5 wherein said indexing arm is formed of a U-shaped channel and said tone arm receiving means comprises a bridge extending from the web of the channel, said channel further including an opening in the same to permit movement of said tone arm engaging element therethrough to engage said tone arm; said connection being defined by a pivot pin connected to said indexing arm and passing through a slot in said tone arm; and said manual actuator comprises a bell crank pivotally secured to said indexing arm and having said handle at one end thereof, said tone arm engaging element being located at the other end thereof; and spring means interposed between the web of said indexing arm and said bell crank for normally biasing the same to a position whereat said tone arm engaging element is disengaged from said tone arm.

* * * * *

UNITED STATES PATENT OFFICE
CERTIFICATE OF CORRECTION

Patent No. 3,697,086 Dated October 10, 1972

Inventor(s) Gunars Licitis

It is certified that error appears in the above-identified patent and that said Letters Patent are hereby corrected as shown below:

Column 2, line 44, change the numeral "46" to --56--.

Column 5, line 26, change "of" to --on--.

Signed and sealed this 13th day of February 1973.

(SEAL)
Attest:

EDWARD M. FLETCHER, JR.
Attesting Officer

ROBERT GOTTSCHALK
Commissioner of Patents